US012646889B2

(12) United States Patent
Zbinden

(10) Patent No.: US 12,646,889 B2
(45) Date of Patent: Jun. 2, 2026

(54) VERTICAL INTERCONNECT SYSTEM FOR HIGH-SPEED DATA TRANSMISSION

(71) Applicant: SAMTEC, INC., New Albany, IN (US)

(72) Inventor: Eric Zbinden, Santa Clara, CA (US)

(73) Assignee: SAMTEC, INC., New Albany, IN (US)

( * ) Notice: Subject to any disclaimer, the term of this patent is extended or adjusted under 35 U.S.C. 154(b) by 267 days.

(21) Appl. No.: 18/248,930

(22) PCT Filed: Oct. 13, 2021

(86) PCT No.: PCT/US2021/054745

§ 371 (c)(1),
(2) Date: Apr. 13, 2023

(87) PCT Pub. No.: WO2022/081682

PCT Pub. Date: Apr. 21, 2022

(65) Prior Publication Data

US 2023/0387631 A1 Nov. 30, 2023

Related U.S. Application Data

(60) Provisional application No. 63/091,131, filed on Oct. 13, 2020.

(51) Int. Cl.
*H01R 13/639* (2006.01)
*G02B 6/42* (2006.01)
*H01R 43/26* (2006.01)

(52) U.S. Cl.
CPC ......... *H01R 13/639* (2013.01); *G02B 6/4284* (2013.01); *H01R 43/26* (2013.01)

(58) Field of Classification Search
CPC ..... H01R 13/639; H01R 43/26; G02B 6/4284

USPC .................................................. 439/347, 345
See application file for complete search history.

(56) References Cited

U.S. PATENT DOCUMENTS

| | | | | |
|---|---|---|---|---|
| 7,104,830 | B1 * | 9/2006 | Diaz .................. | H01R 13/6395 |
| | | | | 439/372 |
| 8,575,529 | B2 * | 11/2013 | Asahi .................. | G02B 6/4232 |
| | | | | 341/143 |
| 9,028,156 | B2 * | 5/2015 | Ishigami .............. | G02B 6/4249 |
| | | | | 385/24 |
| 9,274,295 | B2 | 3/2016 | Droesbeke | |
| 9,442,255 | B2 | 9/2016 | Pommer et al. | |
| 9,465,176 | B2 | 10/2016 | Pommer et al. | |
| 9,494,750 | B2 | 11/2016 | Lee et al. | |
| 10,795,091 | B2 * | 10/2020 | Rosenberg ............. | G02B 6/423 |
| 11,125,956 | B2 * | 9/2021 | Zbinden .............. | G02B 6/4283 |
| 11,621,528 | B2 | 4/2023 | Ishida et al. | |
| 2006/0270283 | A1 | 11/2006 | Kumazawa et al. | |
| 2009/0208168 | A1 | 8/2009 | Ishikawa et al. | |

(Continued)

FOREIGN PATENT DOCUMENTS

| | | |
|---|---|---|
| CN | 110045466 A | 7/2019 |
| JP | 2003-511815 A | 3/2003 |

(Continued)

*Primary Examiner* — Gary F Paumen
(74) *Attorney, Agent, or Firm* — Gray Ice Higdon

(57) ABSTRACT

A vertical interconnect module and mating receptacle are described. The vertical interconnect module may be a transceiver, transmitter, or receiver that is part of an optical communication system. The vertical interconnect module has a low profile and small footprint. The interconnection system is capable of transferring information at high data rates.

15 Claims, 9 Drawing Sheets

(56)          References Cited

U.S. PATENT DOCUMENTS

| | | |
|---|---|---|
| 2009/0297101 A1 | 12/2009 | Ono et al. |
| 2010/0171023 A1 | 7/2010 | Asahi et al. |
| 2010/0303423 A1 | 12/2010 | McColloch |
| 2012/0063718 A1 | 3/2012 | Steijer et al. |
| 2013/0108224 A1 | 5/2013 | Ishigami et al. |
| 2014/0105549 A1 | 4/2014 | Kohnishi |
| 2014/0308838 A1* | 10/2014 | Kuo .................. H01R 13/6395 |
| | | 439/347 |
| 2015/0031228 A1* | 1/2015 | Oh ..................... H01R 13/6275 |
| | | 439/347 |
| 2015/0270644 A1* | 9/2015 | Marsh ................. H01R 13/639 |
| | | 439/347 |
| 2019/0018203 A1 | 1/2019 | Rosenberg et al. |
| 2020/0292769 A1 | 9/2020 | Zbinden |
| 2020/0310054 A1 | 10/2020 | Epitaux et al. |
| 2020/0326495 A1 | 10/2020 | Liao et al. |
| 2020/0403334 A1 | 12/2020 | Parkes et al. |
| 2021/0194164 A1 | 6/2021 | Epitaux et al. |
| 2022/0350089 A1 | 11/2022 | Puffer et al. |

FOREIGN PATENT DOCUMENTS

| | | |
|---|---|---|
| TW | 201809772 A | 3/2018 |
| WO | 2018/035108 A1 | 2/2018 |
| WO | 2018/191248 A1 | 10/2018 |
| WO | 2019/018728 A1 | 1/2019 |
| WO | 2022/081682 A1 | 4/2022 |
| WO | 2022/081683 A1 | 4/2022 |

* cited by examiner

VERTICAL INTERCONNECT SYSTEM FOR HIGH-SPEED DATA TRANSMISSION

CROSS-REFERENCE TO RELATED APPLICATIONS

This is the National Stage Application of International Patent Application No. PCT/US2021/054745, filed Oct. 13, 2021, which claims priority to U.S. Patent Application No. 63/091,131 filed Oct. 13, 2020, the disclosure of which is hereby incorporated by reference as if set forth in its entirety herein.

BACKGROUND

Interconnect modules are used to transmit information between two points in a communication system. The use of optical interconnect modules, instead of electrical interconnects, provides a significant gain in terms of bandwidth distance product and power dissipation reduction. Optical interconnect modules can take the form of an optical transceiver, optical transmitter, or optical receiver. Optical transceivers interface with optical fibers, one or more of which are optical receive fibers that are configured to receive optical input signals, and one or more fibers of which are optical transmit fibers that are configured to transmit optical output signals. In some cases, the optical fibers plug into the optical transceiver, whereas in other cases the optical fibers are permanently attached (commonly known as pigtailed) to the optical transceiver. Optical transceivers further include electrical contacts, one or more of which being electrical receive contacts that are configured to receive electrical input signals, and one or more of which being electrical transmit contacts that are configured to transmit electrical output signals. The electrical contacts of the transceiver are configured to mate with complementary electrical contacts of a complementary electrical device, such as a complementary electrical connector that is, in turn, is mounted to the host substrate that can be configured as a printed circuit board (PCB).

Optical transceivers include an optical transmitter that receives the electrical input signals and activates a light source to generate the optical output signals to the optical transmit fibers for use in a communication system. The optical output signals correspond to the received electrical input signals. The light source is typically a laser light source, such as a VCSEL (Vertical Cavity Surface Emitting Laser) or some other type of laser. The optical transmitter includes an integrated circuit (IC) die that is configured as a driver that is electrically connected to the VCSEL and modulates the driving current of the VCSEL effectively modulating its light output. Other types of light sources may be used and the light source may generate a constant output light level which is then modulated by another element in the transceiver.

Unfortunately, light source performance, such as VCSEL performance, is degraded by operating at elevated temperatures.

Depending on the type of VCSEL used, operating VCSELs at temperatures exceeding 70 C, 80 C, or 85 C may result in unacceptable VCSEL lifetime or electrical-to-optical conversion efficiency. Generally, the upper limit of the VCSEL operating temperature is significantly lower than the operating temperature limit of an IC, which may be situated adjacent the VCSEL. For example, the IC may have an operating temperature limit of 100 C. While the IC can withstand a higher operating temperature, it typically generates an order of magnitude more waste heat than the VCSEL. For example, in operation the IC may generate 2.0 W of waste heat while the VCSEL may only generate 0.1 W of waste heat.

Optical transceivers further include an optical receiver that receives the optical input signals and converts the optical input signals to electrical output signals that correspond to the received optical input signals. The optical receiver typically includes one or more photodetectors that receive optical input signals, and convert the optical input signals to electrical signals that can have current levels proportional with the quantity of optical photons per unit time received in the optical signals. The optical receiver further typically includes a current-to-voltage converter, such as a transimpedance amplifier (TIA) that amplifies and convert the electrical current signals to voltage levels that are usable in data communication systems. The TIA is typically constructed as an integrated circuit (IC) die. The optical engine can be either a transmitter, a receiver, or both. Further, the transmitter can be mechanically separate from the receiver. Alternatively, the transmitter can be mechanically integrated with the receiver. The photodetectors are often configured as photodiodes that, as with the VCSELs, are adversely affected at high operating temperatures. The light source of the transmitter and photodiode of the receiver may generally be referred to as electro-optical elements, since they all are involved either with the conversion of an electrical signal to an optical signal or vice versa.

In operation, optical transceivers generate heat and thus typically are provided with heat dissipation systems. Thus, optical transceivers typically include one or more heat transport and, or dissipation members that are in thermal communication with one or more heat producing elements and transfer the heat to the periphery of the transceiver housing, which in turn is connected to a heat dissipation member or heat dissipation plate. Conventional transceiver design limits from which side or sides the heat can be removed from the transceiver, and in turn limits design options for integrating the optical transceiver into a communication system.

It would be advantageous if an optical interconnect module has a low profile and small footprint and is capable of transferring information at high data rates.

SUMMARY

In some embodiments a vertical interconnect module is described. The vertical interconnect module has a substrate having a bottom surface with a length and a width, a housing, and a module electrical connector. The housing and module electrical connector are arranged adjacent each other on the bottom surface of the substrate and the module electrical connector extends substantially across the entire width of the substrate.

In some examples, the vertical interconnect module can include an interconnect module substrate having a major top surface and a major bottom surface opposite the major top surface in a downward direction, the interconnect module substrate having a length along a longitudinal direction that is perpendicular to the downward direction, and the interconnect module substrate having a width along a lateral direction that is perpendicular to each of the downward direction and the longitudinal direction. The vertical interconnect module can further include an optical engine mounted to the major bottom surface of the interconnect module, wherein the optical engine is configured to direct light to an optical cable and receive light from the optical cable when the optical cable extends out from the interconnect module substantially along a plane that is defined by the longitudinal direction and the lateral direction. The vertical interconnect module can further include a module electrical connector supported by the major bottom surface of the interconnect module substrate, wherein the module electrical connector includes an electrically insulative connector housing and a plurality of electrical contacts supported by the electrically insulative connector housing, wherein the electrical contacts are configured to wipe against complementary electrical contacts of a complementary electrical connector when the module electrical connector is mated with the complementary electrical connector in the downward direction.

In other embodiments a host module arranged to mate with a vertical interconnect module are described. The host module includes a host electrical connector having a housing and a plurality of electrical contacts; a frame; and a latch. The frame and housing are rigidly connected and the latch slides along a guide in the bottom of the housing.

In some examples, the host module can include a host electrical connector including an electrically insulative host connector housing and a plurality of host connector electrical contacts supported by the electrically insulative receptacle connector housing, wherein the host electrical connector is configured to be mounted to a major surface of a host substrate, and the host electrical connector is configured to mate with a complementary electrical connector along a mating direction perpendicular to the major surface. The host module can further include a latch that is movable between an engaged position and a disengaged position, whereby the latch in the engaged position prevents the complementary electrical connector from unmating from the host electrical connector, and the latch in the disengaged position allows the complementary electrical connector to unmate from the host electrical connector. The host module can further include a frame configured to be mounted to the major surface of the host substrate, wherein the frame is configured to guide and surround an interconnect module assembly of an interconnect module when the host module is mated with the interconnect module, the interconnect module assembly including the complementary electrical connector and an interconnect module housing.

In other embodiments a vertical interconnect system is described. The vertical interconnect system includes a vertical interconnect module and a host module. The receptacle includes a latch that slides in a direction normal to a mating direction of the vertical interconnect module and electrical connector the host module to secure the vertical interconnect module to the host module.

DETAILED DESCRIPTION

Figure 1:
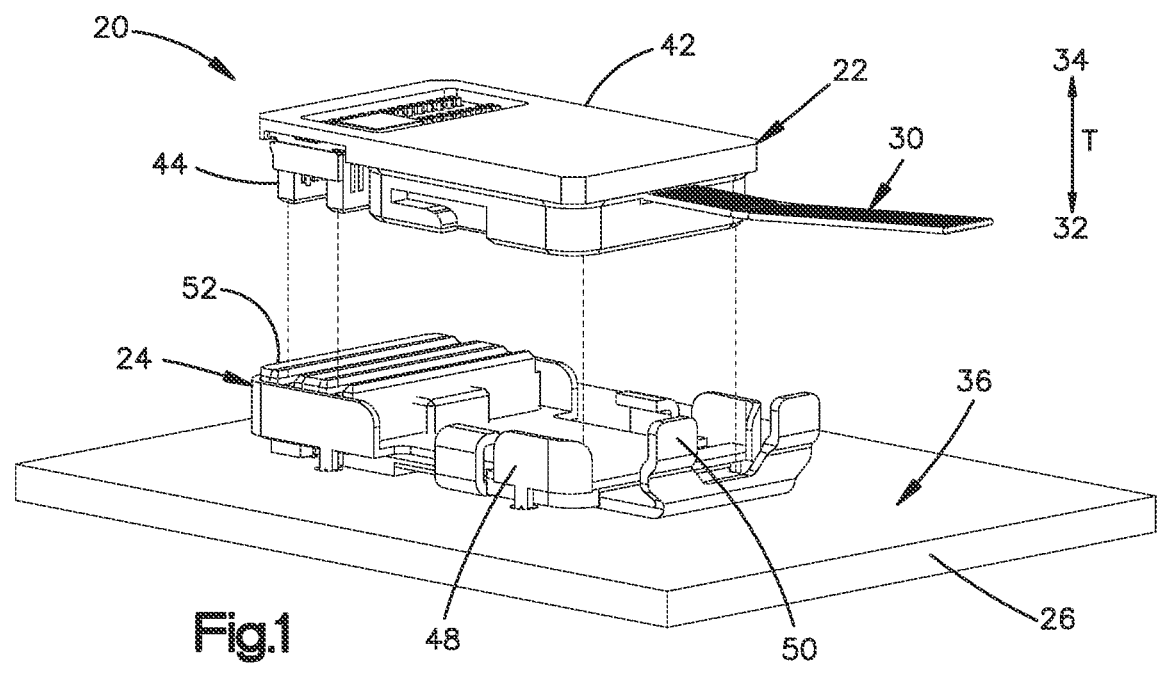
FIG. 1 is a perspective view of a vertical interconnect system.

FIG. 1 shows an embodiment of a vertical interconnect system 20. The vertical interconnect system 20 includes a vertical interconnect module 22 and a host module that can be configured as a receptacle 24. The vertical interconnect module 22 is arranged to mate with the receptacle 24. The vertical interconnect system 20 can further include a host substrate 26. The receptacle 24 may be mounted to the host substrate 26. In one example, the host substrate 26 can be configured as a host printed circuit board. The vertical interconnect module 22 may be configured as a transceiver, transmitter, or receiver that transmits and/or receives signals from a cable 30 and directs the signals from and/or to the host substrate 26. The signal connection between the vertical interconnect module 22 and receptacle 24 is electrical in nature and is established by mating at least one electrically conductive contact in the receptacle 24 with at least one corresponding electrically conductive contact in the vertical interconnect module 22. The connection is established by inserting the vertical interconnect module 22 in a substantially downward direction 32 into the receptacle 24. The downward direction 32 can be oriented along a transverse direction. The downward direction 32 can further be oriented perpendicular to and towards a major surface 36 of the host substrate 26 to which the receptacle 24 is mounted. The directional terms "downward," "down," and derivatives thereof as used herein refer to the downward direction 32. The contact forces between the electrical contacts of the vertical interconnect module 22 and the receptacle 24 may be substantially normal to a mating direction 38 between the vertical interconnect module 22 and receptacle 24. The mating direction 38 can be oriented along the transverse direction T, which can be defined by a vertical direction when the host substrate 26 is oriented horizontally, such that the major surface 36 is disposed along a plane that is defined by a longitudinal direction L perpendicular to the transverse direction T, and a lateral direction A perpendicular to the longitudinal direction L and the transverse direction T.

The vertical interconnect module 22 may have an optical engine 28 that performs an optical-to-electrical or electrical-to-optical conversion and may be referred to as an optical vertical interconnect module. The vertical interconnect module 22 may alternatively have no optical-to-electrical or electrical-to-optical conversion capability and may be referred to as an electrical vertical interconnect module. The electrical vertical interconnect module may have only passive components (i.e. capacitors, resistors, etc.) or may contain a mixture of active (i.e. transistors, integrated circuits, etc.) and passive components. The vertical interconnect module 22 can include a cable 30 that, in turn, includes at least one optical waveguide 40. The optical waveguide 40 may be an optical fiber. The cable 30 in the electrical vertical interconnect module 22 includes at least one electrically conductive wire. In some embodiments, the cable 30 in the optical vertical interconnect module 22 may include both an optical fiber and an electrically conductive wire.

Figure 2:
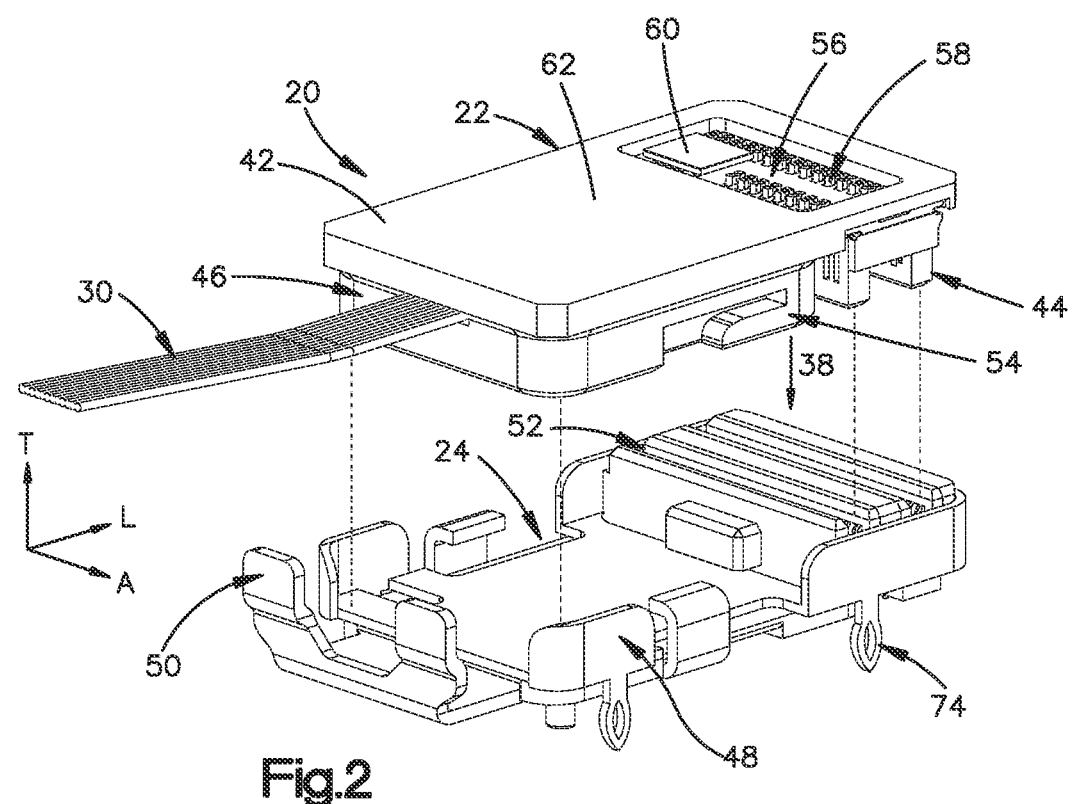
FIG. 2 shows a different perspective view of a vertical interconnect system.
Figure 3A:
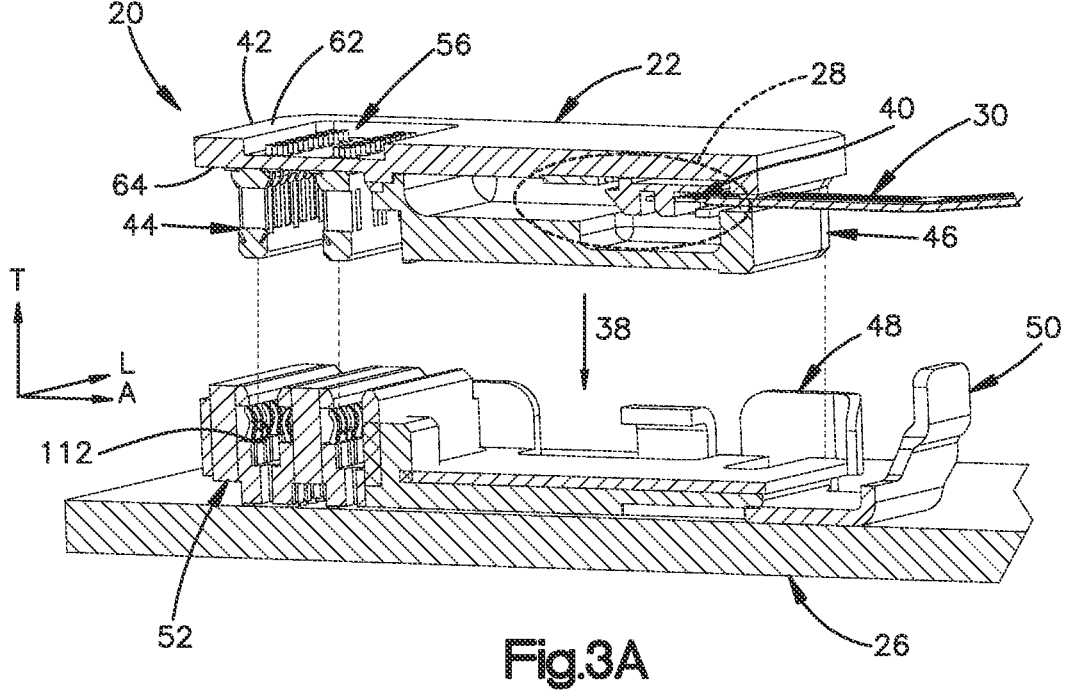
FIG. 3A shows a cross-sectional view of an optical vertical interconnect module.

Referring to FIGS. 2-3A, the vertical interconnect module 22 can include an interconnect module substrate 42, a module electrical connector 44, and an interconnect module housing 46 supported by the interconnect module substrate 42. Additionally, the vertical interconnect system 20 can include a host module that can be configured in one example as a receptacle 24. It is recognized, of course that the host module can be otherwise configured as desired. Thus, the description herein of the receptacle 24 can apply with equal force and effect to the host module that can be configured as other than a receptacle. The receptacle 24 can include a frame 48, a latch 50, and a host electrical connector 52. The host electrical connector 52 can also be referred to as a complementary electrical connector of the complementary module, and vice versa. The vertical interconnect module 22 can mate with the receptacle 24 by inserting the module in a downward direction relative to the receptacle 24 until the module electrical connector 44 mates with the host electrical connector 52. In one example, the vertical interconnect module 22 can be received by the receptacle 24. The vertical interconnect module 22 unmates with the receptacle 24 by moving the module in an upward direction 34 from the receptacle 24 until the module electrical connector 44 unmates from the host electrical connector 52. The upward direction 34 is opposite the downward direction 32 and is also oriented along the transverse direction T. In this regard, the module electrical connector 44 can be referred to as a complementary connector to which the host electrical connector 52 can mate and unmate. The directional terms "upward," "up," and derivatives thereof as used herein refer to the downward direction 34.

The frame 48 may help to guide the vertical interconnect module 22 when mating and help to retain the vertical interconnect module 22 when mated. A latching system may be present to prevent the module from unmating when the module is mated to the receptacle 24. The latching system may include the latch 50 incorporated into the receptacle 24 and a retaining feature 54 incorporated into the interconnect module housing 46. As shown in FIG. 2, the module is installed in the receptacle 24 with the interconnect module substrate 42 positioned on the side of the module opposite from the receptacle 24. The interconnect module housing 46 is located between the interconnect module substrate 42 and the receptacle 24.

The vertical interconnect module 22 has a length measured along the longitudinal direction L, a width measured along the lateral direction A, and a height measured along the transverse direction T. Generally, the module length is longer that its width and its width is longer than its height, although this is not a requirement.

FIG. 3A shows a cross-sectional view of a vertical interconnect module 22 configured as an optical vertical interconnect module. The interconnect module substrate 42 can be an organic substrate (epoxy glass, polyimide, etc.), a glass substrate, or a ceramic substrate (BeO, AlN, Al₂O₃ or LTCC (low temperature co-fire ceramic, etc.). Each substrate material may be formed with a number of layers bonded together with electrically conductive traces on surfaces of some of the layers. Electrically conductive vias may electrically connect electrical traces on different layers. Each substrate material has pros and cons. Both ceramic and organic substrates are well suited to route power, low and high-speed signals and support vias. Surface mount component like electrical connector leads, chip capacitors and resistors, microchip packages (BGA (ball grid array), etc) and bare die chips can be soldered, flip-chip mounted and/or wirebonded to the interconnect module substrate 42. Alternatively, bare die chips can also be epoxied to any substrate material.

Advantages of an organic substrate include low cost and a closer match of the coefficient of thermal expansion to metals and polymers. Metal risers and stiffeners can be soldered to or otherwise attached to the interconnect module substrate 42 to provide mounting surfaces, spacers or to increase rigidity of the assembly. Organic substrates are also easier to route and allow through holes and/or complex outlines than ceramic or glass substrates. Potential disadvantages of an organic substrate may be difficulties in supporting cavities and pockets, although small components can be embedded in them in certain cases. Organic substrates may also have higher loss for transmitted electrical signals, particularly at high frequencies.

Advantages of a ceramic substrate are generally increased rigidity (higher Young modulus), flatness, and high thermal conductivity. They readily support cavities and pockets and can support wrap around and sidewall metallization. Their coefficient of thermal expansion is a better match to Si and III-V materials, but dimensional tolerances may be hard to control due to batch-to-batch shrinkage variation during the firing process. Glass substrates have desirable dielectric properties allowing transmission of high-speed signals with good signal integrity. In some embodiments, the different layers of the interconnect module substrate 42 may be formed from different materials.

Thermal vias may be incorporated in any type of substrate to improve thermal conductivity of the substrate. The thermal vias may be through holes in the substrate filled with a high thermal conductivity material, such as copper.

The embodiment shown in FIG. 3A has a multilayer ceramic interconnect module substrate 42, but it could also use a different substrate material. The interconnect module substrate 42 may have a top cavity 56 formed in a major top surface 62 of the interconnect module substrate 42 that is disposed opposite a major bottom surface 64 of the interconnect module substrate 42. The major top and bottom surfaces 62 and 64 can each extend along the lateral direction A and the longitudinal direction L. The bottom surface 64 can be opposite the top surface 62 along a downward direction that is oriented along the transverse direction T. Conversely, the top surface 62 can be opposite the bottom surface 64 along an upward direction that is opposite the downward direction and oriented along the transverse direction T. The module electrical connector 44 can be mounted to the bottom surface 64, and the top surface 62 can thus face opposite the module electrical connector 44.

The top cavity 56 allows ancillary electrical components such as capacitors 58 that can be configured as DC blocking capacitors, resistors, one or more microcontrollers 60 and/or other components to be attached to the interconnect module substrate 42 without protruding above the top surface 62 of the interconnect module substrate 42. This allows the top surface 62 of the interconnect module substrate 42 to contact an adjoining flat surface. The top surface 62 may be a thermal interface arranged to remove heat generated by an optical engine 28 mounted to the bottom of the interconnect module substrate 42. The top surface 62 of the interconnect module substrate 42 may be substantially flat, except for the top cavity 56. In operation, the top surface 62 of the interconnect module substrate 42 may abut an external heat sink, cold plate, or other heat carrying or dissipative element (not shown in FIG. 3A). The module electrical connector 44 and optical engine 28 may be mounted side by side on a bottom side of the interconnect module substrate 42. The optical engine 28 may be spaced in the longitudinal direction L from the module electrical connector 44 as shown in FIG. 3A. The module electrical connector 44 and optical engine 28 may be mounted near one end of the interconnect module substrate 42. Alternatively, optical engine 28 may be spaced in the lateral direction A from the module electrical connector 44. This arrangement minimizes the overall height of the installed module. Placing ancillary components in the cavity 56 opposite the module electrical connector 44 helps to minimize the footprint of the module 22 and receptacle 24 on the host board.

In the case of an electrical vertical interconnect module 22, the optical cable would be replaced by an electrical, copper cable. The copper cable's attachment region and the module electrical connector 44 may be mounted side by side along the longitudinal direction L or the lateral direction A on the bottom surface 64 of the interconnect module substrate 42, opposite the top of the interconnect module substrate 42. The top surface 62 of the interconnect module substrate 42 may define a thermal interface.

The optical engine 28 comprises at least some of the following; one or more photodetectors 66 and transimpedance amplifiers (TIA) 68; one or more laser drivers 70 (see FIGS. 9A-9C) and array of lasers 72; and an optical coupling system to couple the light to and/or from the optical engine 28 into the optical waveguide 40, such as an optical fiber of the cable 30. In some embodiments the optical engine 28 may include other components, such as an external modulator. The optical engine 28 may have parallel channels that transmit and/or receive high-speed data signals.

The components of the optical engine 28 are mounted on the bottom surface 64 of the interconnect module substrate 42. This provides a short path having a large cross-sectional area between the optical engine 28 and top surface 62 of the interconnect module substrate 42 (see FIG. 8). As a result, heat generated by the optical engine 28 may travel to a cooling element, such as a heatsink or cold plate, contacting the top surface 62 of the interconnect module substrate 42. Optionally there may be a thermal interface material situated between the interconnect module substrate 42 and heatsink/cold plate. This arrangement helps to ensure a small temperature differential between the optical engine 28 and the cooling element.

For a transmitter, the optical coupling system couples light generated by the laser between the laser's emitting surface and the optical waveguide 40. For a receiver, the optical coupling system couples light from the optical waveguide 40 to a photodetector 66. For a transceiver, the optical coupling system performs both coupling between a laser and the optical waveguide 40, and the optical waveguide 40 and a photodetector 66. The coupling system can also perform other functions like, but not limited to, redirecting a portion of the light into an optical power monitoring system.

Figure 3B:
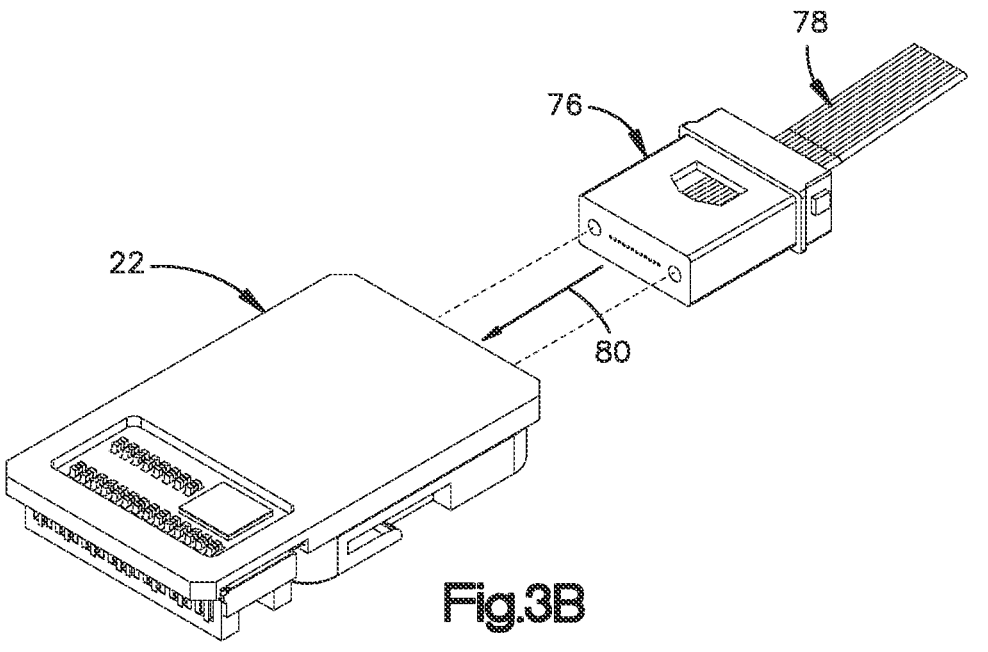
FIG. 3B shows a vertical interconnect module with a detachable optical connection.

The embodiment shown in FIG. 3A illustrates a fiber pigtail configuration, in which the optical waveguide 40 is an optical fiber permanently attached to the optical engine 28. Alternatively, a pigtailed optical fiber could be replaced by a system arranged to mate to a detachable optical waveguide through an optical connector 76 along an optical connector insertion or mating direction 80, which can be oriented along the longitudinal direction L. Such a system is shown in FIG. 3B. The detachable optical waveguide 78 can be one or more optical fibers arranged as an optical fiber ribbon. The optical connector 76 can be an MT ferrule, PRIZM™, MPO connector or other connector type.

Figures 4, 5A, 5B:
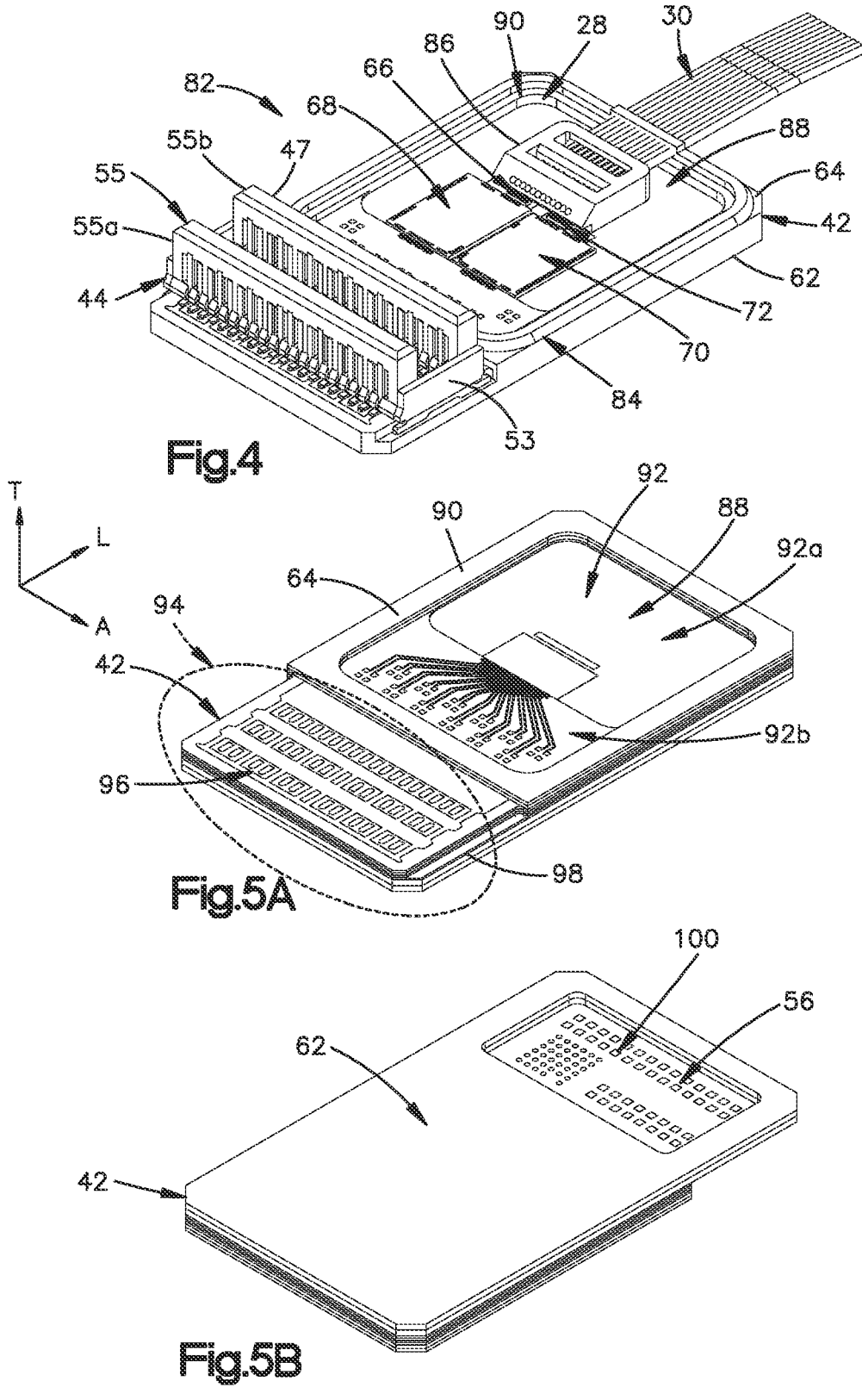
FIG. 4 shows an exemplary optical transceiver with the housing removed.
FIG. 5A shows the bottom surface of the substrate.
FIG. 5B shows the top surface of the substrate.

FIG. 4 shows an exemplary optical transceiver 82 with the interconnect module housing 46 removed. The optical engine 28 can be built into a bottom cavity 88 situated in the bottom surface 64 of the interconnect module substrate 42. The optical transceiver 82 of FIG. 4 can include the optical engine 28 that, in turn, includes both transmitting and receiving elements. Specifically, the optical engine 28 includes a laser driver 70, an array of lasers 72, an array of photodetectors 66, a transimpedance amplifier (TIA) 68 and an optical block 86. The lasers 72 can be configured as VCSELs, although other types of laser sources may be used. The optical block 86 directs light from the laser of the optical engine 28 to fibers in the cable 30 and directs light from fibers of the cable 30 to the array of photodetectors 66 of the optical engine 28. The bottom cavity 88 may be surrounded or defined by a short wall 90 designed to interface with a housing (not shown in FIG. 4) via a sealing ring 84 to seal the optical engine 28 from the environment. The bottom cavity 88 can have multiple levels 92 (see FIG. 5A) having different heights along the transverse direction T. The height of the various levels may be chosen as desired. For example, if wirebonds are used to connect the various electrical elements, heights of the various bottom cavity levels may be chosen so as to vertically align wire-bonding pads so the length and inductance of the wire-bonds can be minimized.

The optical transceiver 82 includes the module electrical connector 44 mounted to the bottom surface 64 of the interconnect module substrate 42. The module electrical connector 44 extends substantially across the entire width of the bottom surface 64 of the interconnect module substrate 42. Here substantially across the entire width means that the module electrical connector 44 extends more than 90%, 95%, or 98% of the width of the interconnect module substrate 42. The module electrical connector 44 may be located at one end of the interconnect module substrate 42. Electrical connections between the laser driver, transimpedance amplifier and module electrical connector 44 are made by electrically conductive traces on or within the interconnect module substrate 42. Having all the electrical connections on one end of the interconnect module substrate 42 may simplify signal routing.

FIGS. 5A and 5B show the bottom and top surface 62 of the interconnect module substrate 42, respectively. The bottom surface 64 may have a bottom cavity 88 with multiple levels 92, including a first level 92a and a second level 92b that is offset from the first level 92a along the transverse direction T. In particular, the second level 92b can be offset from the first level 92a in the downward direction. A wall 90 may surround or define the bottom cavity 88. An optical engine can be situated in the bottom cavity 88 as previously described. Adjacent the bottom cavity 88 may be a connector contact area 94. The connector contact area 94 has a plurality of connector electrical pads 96 suitable for surface mounting of the contacts of the module electrical connector 44. The second level 92b can be disposed between the first level 92a and the electrical pads 96 with respect to the longitudinal direction L. The connector contact area 94 may also have one or more ledges 98. In FIG. 5A one ledge is visible and a second ledge is not visible but is present on the opposite side of the interconnect module substrate 42. The ledges 98 may be metallized and serve as attachment areas for the module electrical connector 44. The metallized ledges 98 may be electrically grounded or may be electrically isolated. Solder may be used to make electrical and mechanical connections between the module electrical connector 44 and the connector pads 96 and metalized ledges 98. As shown in FIG. 5B, the top surface 62 may have component electrical contact pads 100 located in the top cavity 56 suitable for surface mounting of the ancillary electrical components.

Figure 6A:
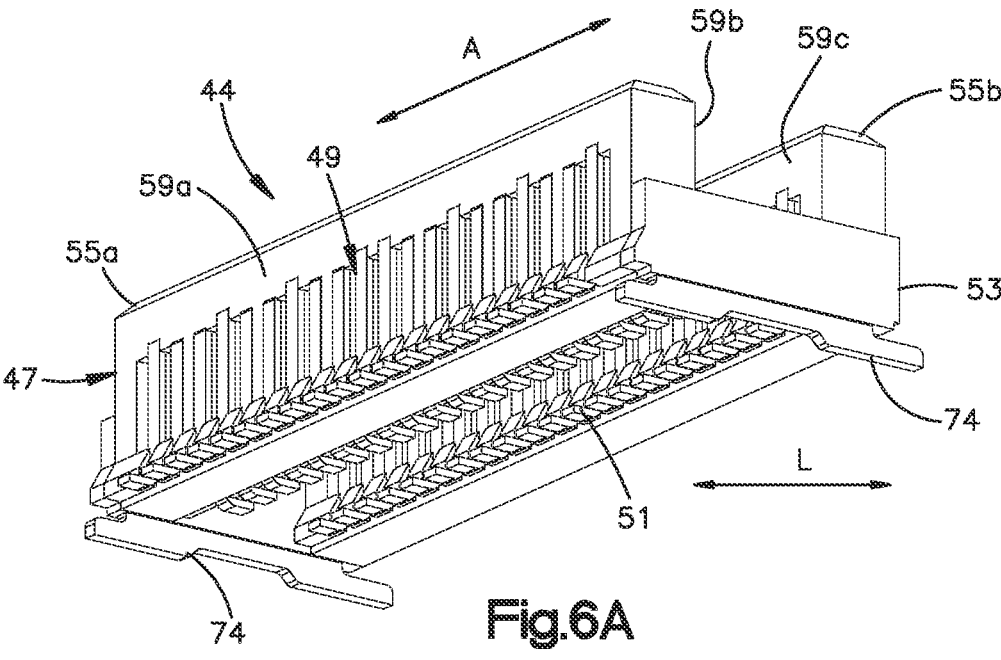
FIG. 6A shows a perspective view of the bottom of a module electrical connector.

FIG. 6A shows a perspective view of the bottom of a module electrical connector 44. The module electrical connector 44 includes an electrically insulative connector housing 47 and a plurality of electrical contacts 49 supported by the electrically insulative connector housing 47. The electrical contacts 49 can be stamped from a sheet of metal, or otherwise formed as desired. The electrically insulative connector housing 47 can define a housing base 53 and at least one housing rib 55 such as a plurality (more than one) of housing ribs 55 that project from the base 53 along the downward direction. The base 53 can be mounted to the bottom surface 64 of the interconnect module substrate 42. The electrical contacts 49 can have mounting ends that terminate at contact leads 51 that are placed in communication with electrical traces of the interconnect module substrate 42 which, in turn, are in electrical communication with the optical engine 28. In particular, the contact leads 51 can be surface mounted or press fit to the interconnect module substrate 42. The contact leads 51 can be disposed along the base 53 of the electrically insulative connector housing 47. The electrical contacts 49 can have second ends opposite the first ends that terminate at mating ends 57. The mating ends 57 can be opposite the contact leads 51 along the transverse direction, such that the electrical contacts can be referred to as vertical contacts. The electrical contacts 49 can be insert molded in the connector housing 47 or can be stitched into the connector housing 47 as desired. The connector housing 47 can extend beyond the mating ends 57 in the downward direction along the transverse direction T, and can extend to the mounting ends.

The electrical contacts 49 can be arranged in respective rows that extend along respective surfaces of respective ones of the housing ribs 55. In one example, the electrically insulative connector housing 47 can have a pair of ribs 55. A first rib 55a of the ribs 55 defines a first contact support surface 59a and a second contact support surface 59b. The second contact support surface 59b can be opposite the first contact support surface 59a along the longitudinal direction L. A first row of the electrical contacts 49 can be arranged along the first contact support surface 59a, and a second row of the electrical contacts can be arranged along the second contact support surface 59b. A second rib 55b of the ribs 55 defines a third contact support surface 59c that faces the second contact support surface 59b along the longitudinal direction L. A third row of the electrical contacts 49 can be arranged along the third contact support surface 59c. If desired, a fourth row of the electrical contacts 49 can be arranged along a fourth contact support surface of the second rib 55b that is opposite the third contact support surface 59c as desired. The rows can be oriented along the lateral direction A or other direction as desired. The vertical interconnect module 22 can thus be devoid of paddle cards that place the optical engine 28 in electrical communication with a complementary electrical connector and the host substrate 26.

Figure 6B:
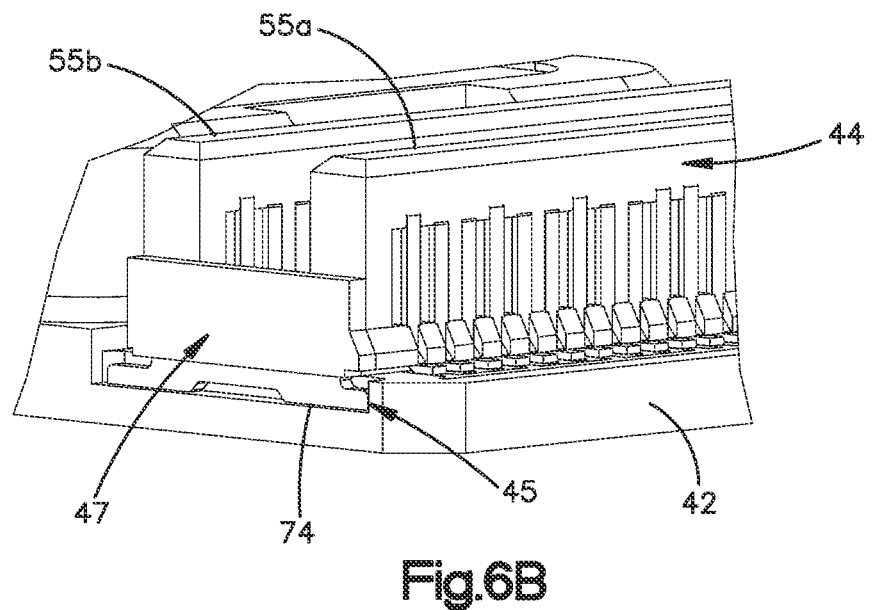
FIG. 6B shows a substrate with a pocket for helping to retain a module electrical connector.

The contact leads 51 may be arranged in rows oriented along the lateral direction A. In this example, there are three rows, but the number of rows can be varied as desired. The module electrical connector 44 may have one or more solder tabs 74 to help secure the module electrical connector 44 to the interconnect module substrate 42. There may be two solder tabs 74, one located at each side of the connector housing. The solder tabs 74 can extend below the connector housing 47 and contacts leads 51. By extending the solder tabs 74 beneath other elements of the module electrical connector 44 can be soldered onto the ledges of the interconnect module substrate 42 shown in FIG. 5A. The connections between the module electrical connector 44 and interconnect module substrate 42 thus do not lie on a common plane. This ensures that reaction forces securing the soldered module electrical connector 44 to the interconnect module substrate 42 will have a compressive component in addition to reaction forces of traction and shear. This will increase the robustness of the connector attachment to the interconnect module substrate 42. FIG. 6A shows a substantially linear solder tabs 74 oriented along the longitudinal direction L. These solder tabs 74 are arranged to mate with the ledges 98 shown in FIG. 5A. This arrangement would not result in compressive forces when the module electrical connector 44 is forced along the longitudinal direction L, since there is no mechanical constraint, other than the solder attachment in this configuration. If desired, the interconnect module substrate 42 can define a pocket 45 instead of or in addition to the ledge. FIG. 6B shows an example of such an arrangement. A solder tab 74 would fit into the pocket 45 so that the module electrical connector 44 would be mechanically constrained in both the lateral direction A and the longitudinal direction L.

The module electrical connector 44 may be a multi-row, low profile connector mating and un-mating in a direction substantially normal to its mounting surface. The module electrical connector 44 may be considered a plug style electrical connector that inserts in the socket of the host electrical connector 52. The depicted module electrical connector 44 includes 3 rows of 20 contacts each or any suitable alternative number of contacts. At least two or more of the rows can be arranged to support high speed differential signals, such that adjacent signal contacts of the electrical contacts 49 can define differential signal pairs. The electrical contacts 49 can be arranged as desired along each row, including a repeating GSSGSSG arrangement or a repeating GSSGGSSG arrangement, where G represents a ground contact of the electrical contacts 49, and S represents a signal contact of the electrical contacts 49. The third row can be a one dimensional "open pin field" connector. Alternatively, each row could support a mix of high-speed differential signal and low speed or power connections. Alternatively still, all rows can define differential signal pairs. As shown in this example, the module electrical connector 44 is capable to carry 12 differential signal pairs suited for transmitting data at transmission speeds up to or exceeding 112 Gbps. The module electrical connector 44 can also have up to 20 low speed signal and voltage contacts.

The module electrical connector 44 can be configured to mate with a complementary electrical connector by moving the module electrical connector 44 relative to the complementary electrical connector in the downward direction. This can be accomplished b moving the module electrical connector 44 in the downward direction, moving the complementary electrical connector in the upward direction, or both. The complementary electrical connector can be configured as the host electrical connector 52 as described above. Respective mating ends 57 of the ground contacts G can extend beyond respective mating ends 57 of the signal contacts S to mate with ground contacts of the host electrical connector 52 before the signal contacts S mate with signal contacts of the host electrical connector 52, and unmate from the ground contacts of the host electrical connector 52 after the signal contacts S unmate from the signal contacts of the host electrical connector 52. The module electrical connector 44 can be configured to mate with the host electrical connector 52 along the downward direction, thereby placing the optical engine 28 in electrical communication with the host substrate 26.

The triple row connector minimizes the overall width while maintaining a manageable contact pitch between 0.4 and 0.8 mm (0.5 mm in this example). In this example, total width of the module electrical connector 44 may be less than 12 mm. The length and height of the module electrical connector 44 are both small and can be between 2 and 6 mm. In FIG. 5, the module electrical connector 44 defines an outer envelope that is W×L×H 11.8×5.0×3.15 mm while the electrical contact footprint is 9.75×3.6 mm. The compact footprint of the connector minimizes stresses caused by differential thermal expansion between the interconnect module substrate 42 and the connector. The compactness of the electrical contact footprint also helps in minimizing dimensional mismatch due tolerancing variations. This may be especially important for a co-fired ceramic substrate where uneven shrinkage during the firing of a substrate makes maintaining high dimensional tolerances over long lengths challenging.

The module electrical connector 44 can have any suitable number of rows as desired, such as two, four, or more. A different number of contacts per row is also possible. By varying both, the number of rows and the number of contacts per row it is possible to 1) increase or decrease the total number of contacts supported by the module electrical connector 44 to support more or fewer data communication lanes and signals or 2) preferentially optimize the overall width or length of the footprint of the module electrical connector 44 or 3) both of the preceding.

Figure 7:
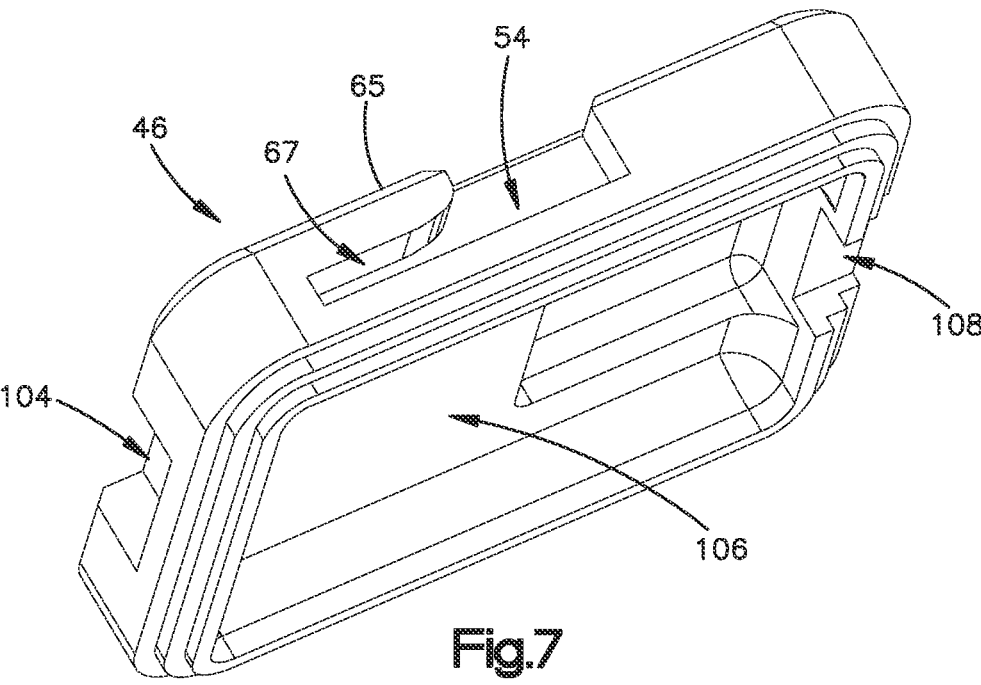
FIG. 7 shows a perspective view of the inside of the housing.

FIG. 7 shows a perspective view of the inside of the interconnect module housing 46. The interconnect module housing 46 can be mounted onto the bottom surface 64 of the interconnect module substrate 42. The interconnect module housing 46 can protect the optical engine 28 from environmental factors and seal it from the outside environment. The seal can be hermetic or not. The interconnect module housing 46 can be machined, stamped or injection molded. The interconnect module housing 46 can be soldered, epoxied or laser welded to the interconnect module substrate 42. The interconnect module housing 46 can have a cavity 106 that receives the optical engine 28. In particular, the optical engine 28 can be disposed between the bottom surface 64 of the interconnect module substrate 42 and the interconnect module housing 46. An opening 108 to the cavity 106 provides space for optical fibers of the cable 30 to extend from the interconnect module housing 46. The interconnect module housing 46 can substantially encapsulate the optical engine 28. That is, the interconnect module housing 46 can surround an entirety of the optical engine 28 with the exception of the opening 108.

The cable 30 can extend through the opening 108 along a direction that is angularly offset with respect to the transverse direction T so as to be placed in optical communication with the optical engine 28. For instance, the cables 30 can extend from the vertical interconnect module 22 substantially along a horizontal plane that is defined by the lateral direction A and the longitudinal direction L. In one example, the cables 30 can extend from the vertical interconnect module 22 substantially along the longitudinal direction. The term "substantially" in this context recognizes that the cables 30 can be slightly inclined with respect to the horizontal plane, for instance up to 25 degrees, including up to 20 degrees, including up to degrees, including up to 10 degrees, including up to 5 degrees. Having the cavity 106 and the opening 108 in the interconnect module housing 46 allows the thickness of the interconnect module substrate 42 as measured along the transverse direction T to be small. Alternatively, the cavity 106 of the interconnect module housing 46 could be deeper and having an opening. This would allow the interconnect module housing 46 to be flat, like a lid.

Figure 10A:
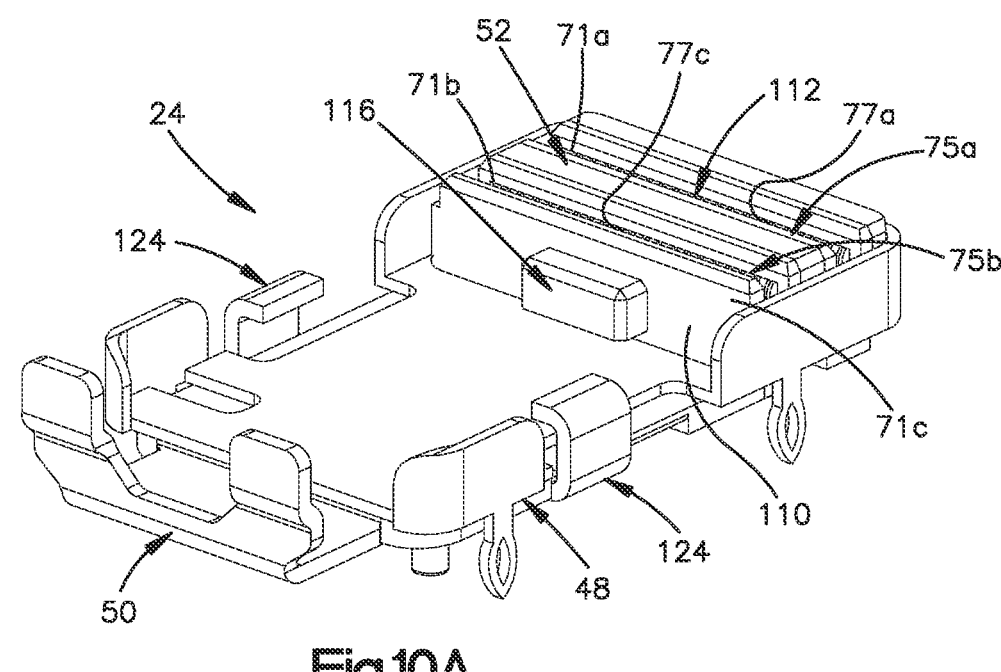
FIG. 10A shows a top perspective view of a receptacle.

The interconnect module housing 46 can include keying features 104 that coincide with "key(s)" on the receptacle 24 as shown in FIG. 10A. The keying feature 104 can be used to prevent mating a vertical interconnect module 22 similar in form factor but different in function. The keying feature 104 may be a recess that has a different size or location depending on the type of vertical interconnect module 22. For example, the recess-key combination for a ×4 bi-directional transceiver can be incompatible with the recess-key combination for a ×12 unidirectional transmitter preventing installing a ×4 transceiver into a ×12 receptacle 24.

The interconnect module housing 46 may also include a retaining feature 43 as part of a latching system that prevents inadvertent disconnection of the vertical interconnect module 22 from the receptacle 24. The retaining feature 54 may include at least one tab 65 such as two tabs 65 on opposite sides of the interconnect module housing 46. Each tab 65 can define a respective L-shaped groove 67. The latch 50 can include engagement members that are configured to be disposed in the grooves 67 when the latch 50 is in an engaged position. In particular, the latch 50 can include hooks 124 that are inwardly curved toward each other that are and extend into the grooves 67 so as to capture the vertical interconnect module 22 and prevent it from moving in the upward direction relative to the receptacle 24, which would disconnect the vertical interconnect module 22 from the receptacle 24. In particular, the tabs 65 interfere with the hooks 124 to prevent the vertical interconnect module 22 from moving in the upward direction relative to the receptacle 24. The latch 50 can be slidable along a horizontal plane between the engaged position and a disengaged position whereby the hooks 124 do not capture the vertical interconnect module 22. The horizontal plane is normal to the mating/unmating direction of the vertical interconnect module 22 and module electrical connector 44. In one example, the latch is slidable along the longitudinal direction L between the engaged position and the disengaged position. The latch 50 can thereby ensure that any forces in the un-mating direction on the vertical interconnect module 22, including the module electrical connector 44, will not disengage the latch 50. Thus, the module electrical connector 44 will not inadvertently unmate from the host electrical connector 52. When the latch 50 is in the disengaged position, the hooks 124 are removed from interference with the tabs 65. The module electrical connector 44 can unmate from the host electrical connector 52 when the latch 50 is in the disengaged position.

Collectively the interconnect module housing 46, a sealing ring 84 (see FIG. 4), and interconnect module substrate 42 may form an enclosed environment surrounding the optical engine 28. This isolates the optical engine 28 from the environment increasing its environmental resilience. It also protects the optical engine 28 from mechanical damage. Separating the optical coupling function of the optical engine 28 from the sealing function of the interconnect module housing 46 allows simplifying the optical block 86 and provides more design freedom to optimize optical coupling. It can also improve manufacturability. Alternatively, the optical engine 28 can be sealed by the optical block 86 or by potting the entire optical assembly. In either case a housing may not be necessary.

Figure 8:
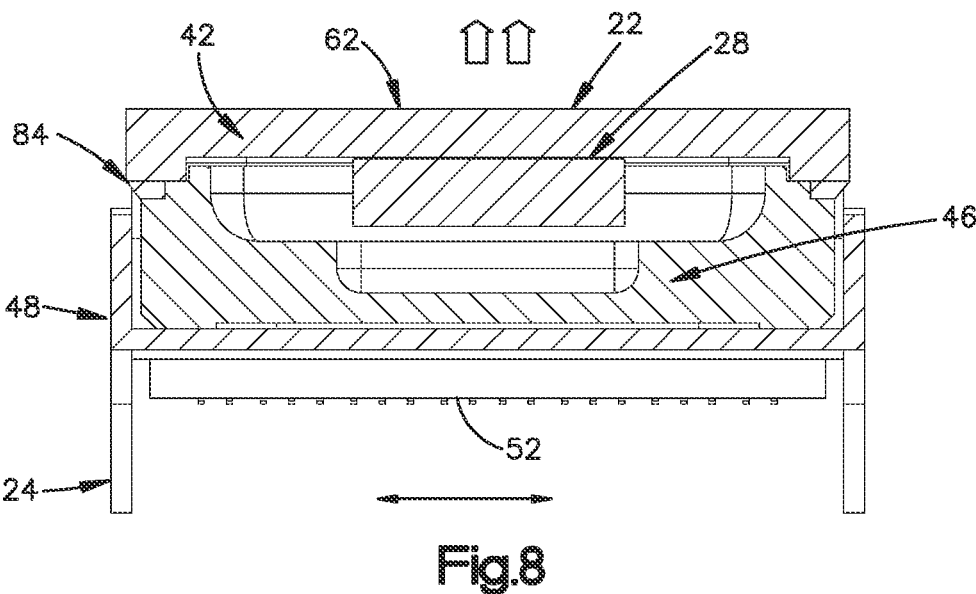
FIG. 8 shows a cross-sectional view of a vertical interconnect module mated with a receptacle.

FIG. 8 shows a cross-sectional view of a vertical interconnect module 22 mated with a receptacle 24. The interconnect module housing 46 can be narrower than the interconnect module substrate 42. Thus, the frame 48 of the receptacle 24 can receive and surround two or more sides of the interconnect module housing 46 as the module electrical connector 44 is mated with the host electrical connector 52. The frame 48 can also receive and surround two or more sides of the electrically insulative connector housing 47 of the module electrical connector 44. In particular, the frame 48 can define a first end wall that extends along and can abut the interconnect module housing 46, a second end wall that extends along and can abut the electrically insulative connector housing 47, a first side wall that extends from the first end wall to the second end wall and further extends along and can abut each of the interconnect module housing 46 and electrically insulative connector housing 47, and a second side wall that is opposite the first side wall, extends from the first end wall to the second end wall, and extends along and can abut each of the interconnect module housing 46 and electrically insulative connector housing 47. In one example, the footprint of the frame 48 does not extend past the footprint of the interconnect module substrate 42 in the horizontal plane. Thus, the frame 48 can be said to surround an interconnect module assembly that includes the module electrical connector 44 and the interconnect module housing 46. In particular, the frame 48 can surround the interconnect module assembly along a plane that is defined by the lateral direction A and the longitudinal direction L, The frame 48 can be a metal frame, a plastic frame, or can be made of any suitable alternative material as desired.

It should be appreciated that the footprints extend along a plane defined by the longitudinal direction L and the lateral direction A. This allows the frame 48 to be as small as possible having a footprint the same or similar in size to the interconnect module substrate 42. In other words, having an interconnect module housing 46 narrower than the interconnect module substrate 42 allows maximizing the size of the interconnect module substrate 42 for a given footprint on the host substrate 26. This ensures that the maximum width and/or length is available to accommodate the optical engine 28. This is particularly important to accommodate larger transimpedance amplifier and laser driver dies. Having a larger volume available for the optical engine 28 also allows increasing the number of high-speed channels or other functions, while minimizing the receptacle footprint on the host substrate 26.

FIG. 8 also helps to illustrate the short heat flow path between the optical engine 28 and the top surface 62 of the interconnect module substrate 42. As noted earlier a heat sink or other type of heat dissipative element may be coupled to the top surface 62 of the interconnect module substrate 42 to remove waste heat generated by the optical engine 28 during operation.

Figures 9A, 9B, 9C:
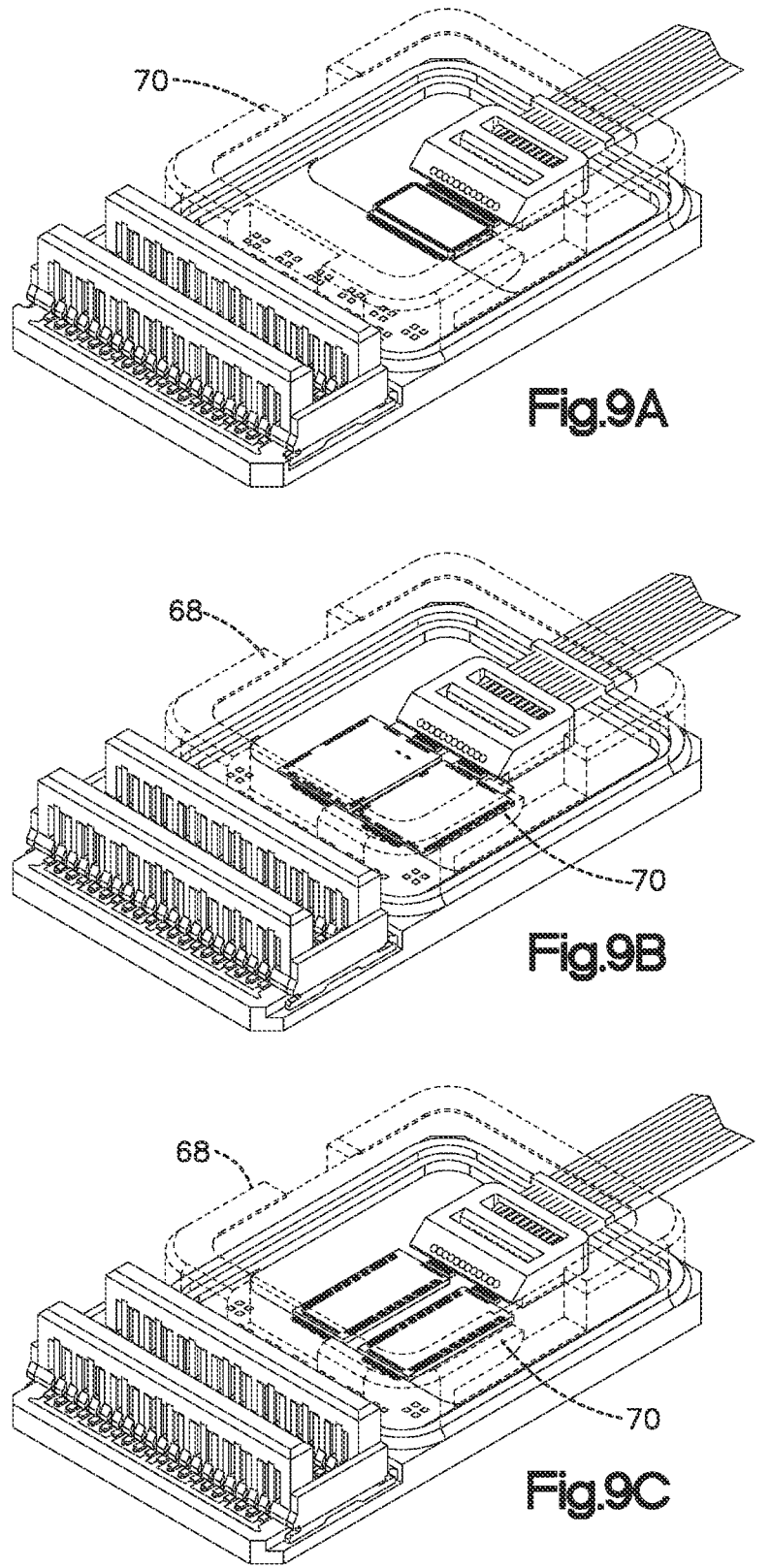
FIGS. 9A-9C show different types of vertical interconnect modules.

FIGS. 9A-C show three examples of a vertical interconnect module corresponding to an optical vertical interconnect module. FIG. 9A shows a 12-channel transmitter. FIGS. 9B and 9C each show a quad (4) channel bidirectional. In FIG. 9B the TIA/laser driver die sizes are wider than in FIG. 9C. Other possible optical vertical interconnect module configurations include but are not limited to; a 12-channel receiver, an 8-channel unidirectional transmitter or receiver, or an 8-channel bidirectional transceiver.

Figure 10B:
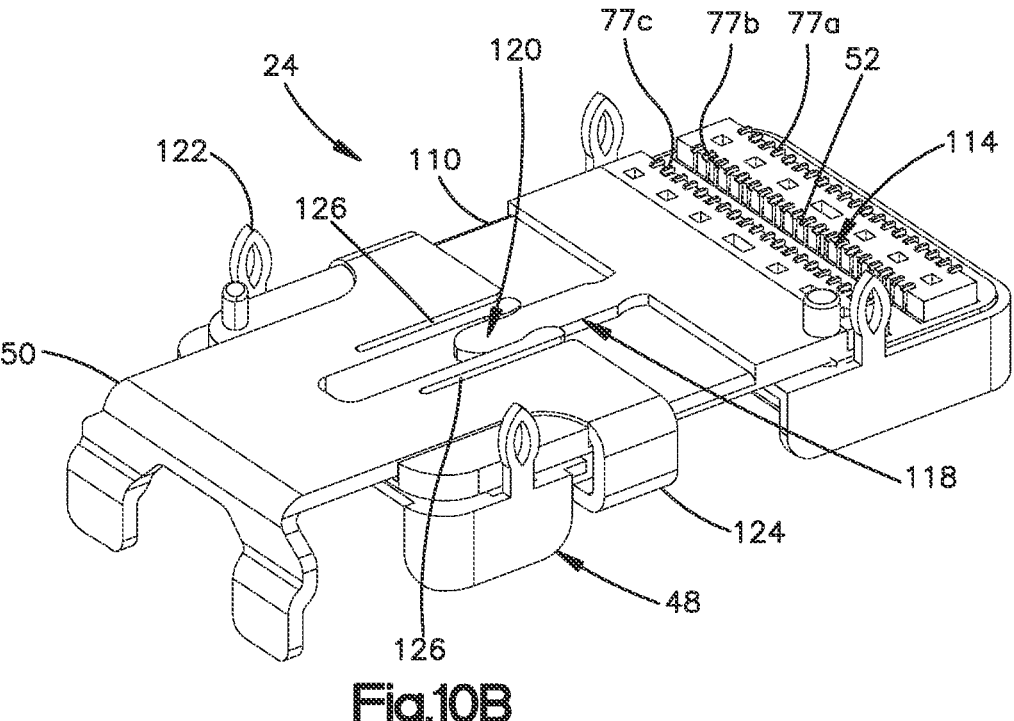
FIG. 10B shows a bottom perspective view of a receptacle.

FIGS. 10A and 10B show a perspective top and bottom view of the receptacle 24, respectively. The receptacle 24 may be soldered to the host board (see FIG. 1). The receptacle 24 may include the host electrical connector 52, the frame 48, and the latch 50. The host electrical connector 52 and frame 48 can be rigidly connected to each other. The latch 50 surrounds a portion of the frame 48 and interconnect module housing 46 and can slide relative to the interconnect module housing 46 and frame 48.

The host electrical connector 52 may include an electrically insulative host connector housing that can be configured as a receptacle connector housing 110, and a plurality of host connector electrical contacts 112 supported by the insulative receptacle connector housing 110. It is appreciated that while the host connector housing can be configured as a receptacle housing, the host connector housing can be alternatively configured as desired. Thus, the description herein of the receptacle connector housing 110 can be applied with equal force and effect to a host connector housing that is not configured as a receptacle housing.

The host connector electrical contacts 112 can extend to a base of the connector housing 110 that is mounted to the host substrate 26, and terminate at host mounting ends. The host mounting ends can be configured as contact leads 114 that are placed in electrical communication with electrical traces of the host substrate 26. In one example, the host contact leads 114 can be surface mounted or press fit to the host substrate 26. The connector housing 110 can extend beyond the mating ends in the upward direction along the transverse direction, and can extend to the mounting ends.

The host electrical connector 52 may be considered a socket style electrical connector that accepts the plug of the module electrical connector 44. In particular, the host connector housing defines first and second opposed walls 71a and 71b that define first and second opposed internal surfaces that face each other along the longitudinal direction L and define a first slot 75a that extends downward into the housing 110. First and second rows 77a and 77b of the host connector electrical contacts 112 can be arranged along the first and second opposed internal surfaces, respectively. The second wall 71b can define a third internal surface that faces away from the second internal surface along the longitudinal direction L. A third row 77c of the host connector electrical contacts 112 can be arranged along the third internal surface. The housing 110 can further include a third wall 71c that is spaced from the second wall 71b along the longitudinal direction L so as to define a second slot 75b. The second wall 71b can be disposed between the first wall 71a and the third wall 71c along the longitudinal direction L. When the host electrical connector 52 is mated with the module electrical connector 44, the first rib 55a is received in the first slot 75a, and the second rib 55b is received in the second slot 75b. When the first rib 55a is received in the first slot 75a, the first and second rows of electrical contacts of the module electrical connector 44 mate with the first and second rows of electrical contacts of the host electrical connector 52, respectively. When the second rib 55b is received in the second slot 75b, the third row of electrical contacts of the module electrical connector 44 mate with the third row of electrical contacts of the host electrical connector 52. Mating ends of the electrical contacts of the host electrical connector 52 can be recessed in the respective slots 75a-b in the downward direction as desired.

The contact forces between the electrical contacts 49 of the module electrical connector 44 and the host connector electrical contacts 112 may be substantially normal to the mating direction between the electrical connectors 44 and 52. The mating direction can be oriented along the longitudinal direction L. This contrasts with land grid array type connectors where a compressive force is required to maintain the electrical connection between the land grid pad and a flexible contact. The electrical contacts 49, and in particular the mating ends, of the module electrical connector 44 and host electrical connector contacts 112 can wipe along each other when the vertical interconnect module 22 is mated with the host electrical connector 52 in the downward direction. For instance, the electrical contacts 49, and in particular the mating ends, of the module electrical connector 44 and host electrical connector contacts 112 can wipe along each other along the transverse direction T when the vertical interconnect module 22 is mated with the host electrical connector 52 in the downward direction. Wiping can improve the electrical contact between the module electrical connector 44 and host electrical connector 52. A portion of the receptacle connector housing 110 may extend under the frame 48. The portion of the receptacle connector housing 110 under the frame 48 may include a guide 118 and two detents 120 symmetrically situated in the guide 118. The guide 118 and two detents 120 may be located on a bottom of the receptacle connector housing 110. The guide 118 and detents 120 engage with the latch 50 as explained in more detail below. The receptacle connector housing 110 may have a keying feature 116 that corresponds with a keying feature 104 on the vertical interconnect module 22 as previously described. The keying feature 116 may be a raised area that corresponds with a recessed area in the interconnect module housing 46 that defines the keying feature 104 of the vertical interconnect module 22. The receptacle connector housing 110 can be formed from a polymer using an injection molding process. The electrical contacts 112 and possibly metal inserts and the frame 48 may be positioned in the mold so that they are embedded in the cured polymer. Thus, the host electrical connector 52 may be formed from insert molding. The receptacle connector housing 110 has features that engage with the frame 48 so that they are rigidly connected to each other.

The frame 48 has multiple functions. The frame 48 guides the vertical interconnect module 22 into position during the mating process. The frame 48 holds the vertical interconnect module 22 in place when mated and provide reaction surfaces to maintain the vertical interconnect module 22 in position during shock and vibrations events or when a force is applied to the vertical interconnect module 22. The frame 48 may provide attachment points between the host substrate 26 and the receptacle 24. The attachment points may be solder tabs 122. The solder tabs 122 can be through hole solder tabs as shown in FIGS. 10A and 10B or they can be surface mount solder tabs 122 that do not require holes in the host substrate 26. Through hole solder tab provide a stronger attachment to the host substrate 26 as compared to surface mount solder tabs. The frame 48 may include one or more alignment pins that fit into holes in the host substrate 26. Alignment pins may be especially advantageous in frame 48*s* with surface mount solder tabs. The frame 48 further provides clearance for the latch 50, so that it can move between its latched and unlatched positions. The frame 48 may have features that capture the receptacle connector housing 110. The frame 48 may be formed from bent and cut sheet metal.

Figure 11:
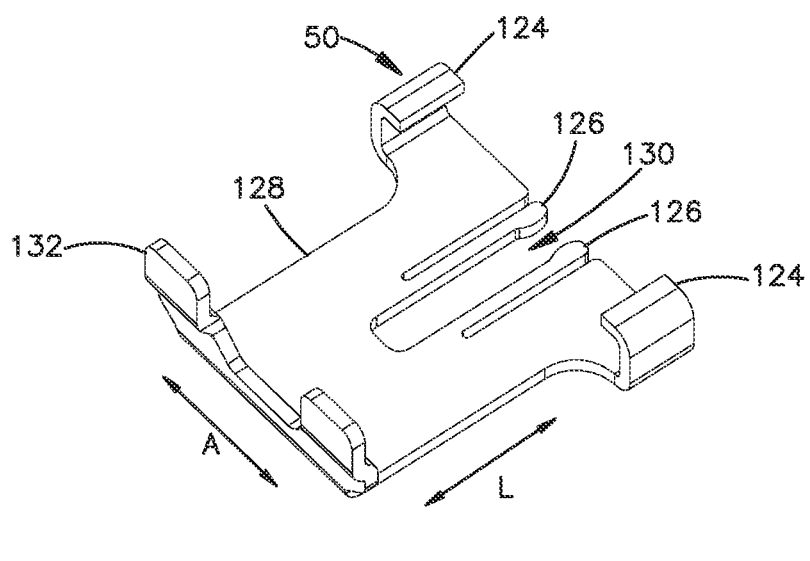
FIG. 11 shows perspective view of a latch.

Referring now to FIG. 11, the latch 50 may have two hooks 124, two flexible arms 126, a base 128, a slot 130, and a tab 132. The hooks 124 may be arranged on opposite sides of the latch 50 along the lateral direction A. The arms 126 may be in the plane of the base 128 and are separated by the slot 130. Each arm 126 may have an enlarged end that can engage with a detent 120 in the receptacle connector housing 110 (see FIG. 10B). The latch 50 preferably moves in the longitudinal direction L with respect to the receptacle connector housing 110 and frame 48. The longitudinal direction L is perpendicular to the insertion direction of the vertical interconnect module 22 into the receptacle 24, which is oriented along the transverse direction T. This feature helps to secure the vertical interconnect module 22 to the receptacle 24. In particular, it helps to make the vertical interconnect module 22 resistant to upwardly directed forces that may try to disconnect the vertical interconnect module 22 from the receptacle 24. The detent mechanism between the latch 50 and the receptacle connector housing 110 can ensure two stable positions to keep the latch 50 in either the mated or the unmated positions. This minimizes the risk of the latch 50 inadvertently switching from the mated to unmated position ensuring that the vertical interconnect module 22 and receptacle 24 remains securely mated. The latch 50 may be formed from cut and bent sheet metal.

Figure 12A:
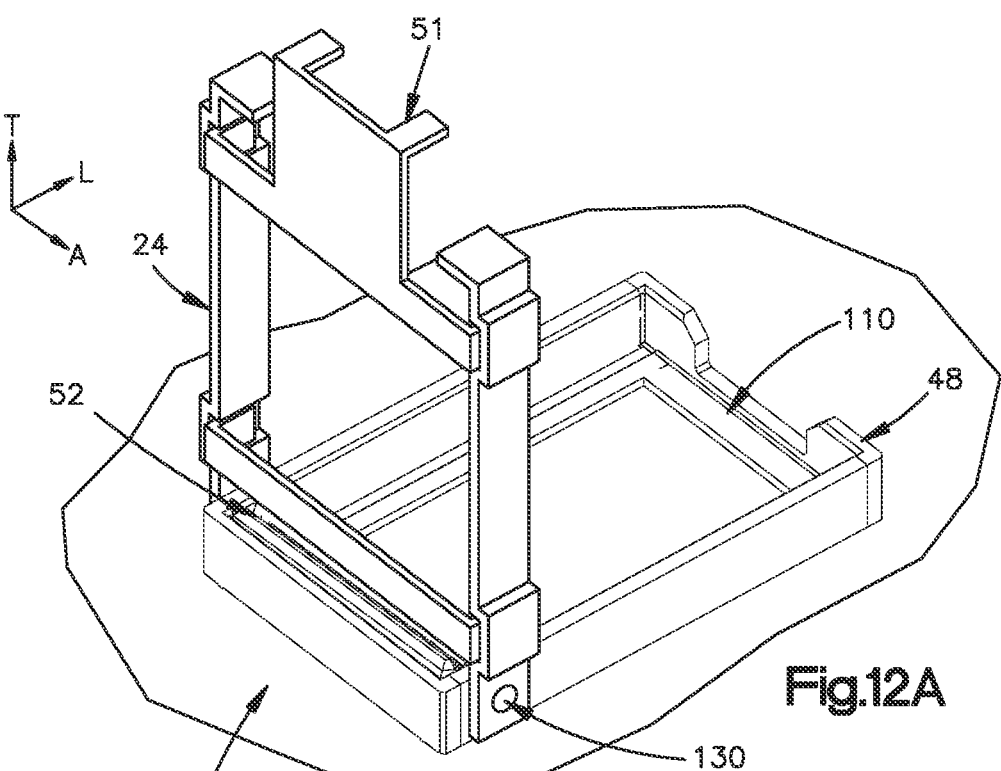
FIG. 12A is a perspective view of a receptacle having a pivot latch.
Figure 12B:
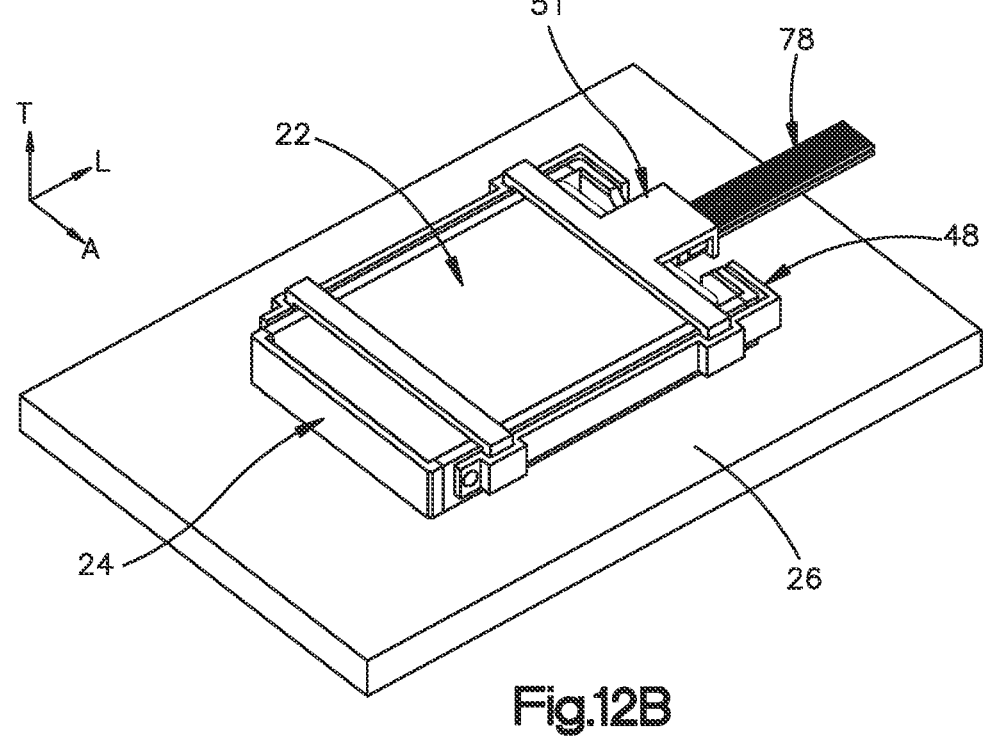
FIG. 12B is a perspective view of a vertical interconnect module mated with a receptacle having a pivot latch.

Referring now to FIGS. 12A-B, the vertical interconnect system 20 can be alternatively constructed such that the latch that is configured as a pivot latch 51 that is pivotally attached to the receptacle connector housing 110. In particular, the receptacle connector housing 110 can define a boss 130 to which the pivot latch 51 is pivotally attached. The pivot latch 51 can pivot about a pivot axis that is oriented along the lateral direction A. In FIG. 12A the pivot latch 51 is in a partially open position. To insert the vertical interconnect module 22 into the receptable, the pivot latch 51 rotates upward so as to not obstruct the vertical interconnect module 22 from being inserted into the receptacle 24 along the transverse direction T in the manner described above. Once the vertical interconnect module 22 is inserted in the receptacle, the pivot latch 51 can be rotated downward so that it engages with the vertical interconnect module 22 securing it in position. FIG. 12B illustrates the pivot latch 51 in its downward position securing the vertical interconnect module 22 into the receptacle 24. In this case the vertical interconnect module 22 has a detachable cable that includes fibers, but this is not a requirement as any type of vertical interconnect module 22 may be used. The pivot latch 51 may engage with features in either the frame 48, receptacle connector housing 110, or both the frame 48 and receptacle connector housing 110 that help secure the pivot latch 51 in its downward latched position. The pivot latch 51 may also have features that help secure an optical connector 76 (see FIG. 3B) that terminates the detachable cable to the vertical interconnect module 22.

Methods can be provided for mating the vertical interconnect module 22 with the host module. In particular, the method can include the steps of aligning the module electrical connector 44 with the host electrical connector 52 along the transverse direction T, and causing them to mate with each other by moving them toward each other along respective mating directions along the transverse direction. Thus, the mating ends 57 of the electrical contacts 49 of the module electrical connector 44 wipe against the mating ends of the host connector electrical contacts 112 along the transverse direction T. The step of mating can further include the step of inserting the interconnect module assembly into the frame 48 in the manner described above.

The terms "upward," "upper," "up," "above," and derivatives thereof are used herein with reference to the upward direction. The terms "downward," "lower," "down," "below," and derivatives thereof are used herein with reference to the downward direction. Of course, it should be appreciated that the actual orientation of the vertical inter-connect system 20 shown in FIG. 1 can vary during use, and that the terms upward and downward and their respective derivatives can be consistently used as described herein regardless of the orientation of the vertical interconnect system and components thereof during use.

It should be appreciated that the illustrations and discussions of the embodiments shown in the figures are for exemplary purposes only and should not be construed limiting the disclosure. One skilled in the art will appreciate that the present disclosure contemplates various embodiments. For example, the module electrical connector 44 has been described as a plug style connector and the host electrical connector 52 has been described as a socket style electrical connector. In alternative embodiments, the socket and plug can be reversed. Also, the module electrical connector 44 and host electrical connector 52 may have a different interconnection system than a plug and socket. Additionally, it should be understood that the concepts described above with the above-described embodiments may be employed alone or in combination with any of the other embodiments described above. It should be further appreciated that the various alternative embodiments described above with respect to one illustrated embodiment can apply to all embodiments as described herein, unless otherwise indicated.

What is claimed:

1. A host electrical connector comprising:
an electrically insulative host connector housing;
a plurality of host connector electrical contacts supported by the electrically insulative host connector housing, wherein the host electrical connector is configured to be mounted to a major surface of a host substrate, and the host electrical connector is configured to mate with a vertical interconnect module along a mating direction perpendicular to the major surface when the host electrical connector is mounted to the major surface; and
a latch that is slideable along a plane that is perpendicular to the mating direction between an engaged position and a disengaged position while the host electrical connector is mated with the vertical interconnect module, whereby the latch in the engaged position prevents the vertical interconnect module from unmating from the host electrical connector, and the latch in the disengaged position allows the vertical interconnect module to unmate from the host electrical connector, wherein the latch has two flexible arms.

2. The host electrical connector of claim 1, wherein the host connector housing defines a first slot that is configured to receive a first rib of the vertical interconnect module and a second slot that is configured to receive a second rib of the vertical interconnect module so as to mate the host connector electrical contacts with the electrical contacts of the vertical interconnect module.

3. The host electrical connector of claim 2, wherein:
the host connector housing defines first and second opposed internal surfaces that define the first slot, and first and second rows of the host connector electrical contacts are arranged along the first and second opposed internal surfaces, respectively, and
the host connector housing defines a third internal surface that partially defines the second slot, and a third row of the host connector electrical contacts are arranged along the third internal surface,
wherein the first, second, and third rows of the host connector electrical contacts mate with the first, second, and third rows, respectively, of the electrical contacts of the vertical interconnect module.

4. The host electrical connector of claim 3, wherein the second and third internal surfaces are defined by a common wall of the host connector housing.

5. The host electrical connector of claim 3, wherein the first and second rows of host connector electrical contacts define mating ends that are recessed in the first slot, and the third row of host connector electrical contacts define mating ends that are recessed in the second slot.

6. The host electrical connector of claim 1, wherein the latch is formed from cut and bent sheet metal.

7. The host electrical connector of claim 1, wherein the latch has a tab.

8. The host electrical connector of claim 1, wherein the latch has a base that extends along a plane, and the two flexible arms are in the plane of the base.

9. A vertical interconnect system comprising:
a vertical interconnect module that includes an optical engine; and
a receptacle connector that includes a slideable latch configured to secure the vertical interconnect module into the receptacle connector,
wherein the receptacle connector includes a receptacle connector housing that guides sliding of the slideable latch between an engaged position and a disengaged position, and
wherein the receptacle connector housing includes two detents that engage with the slideable latch.

10. The vertical insertion system of claim 9, wherein the slideable latch slides between an engaged position and a disengaged position in respective directions normal to a mating direction of the vertical interconnect module into the receptacle connector.

11. The vertical insertion system of claim 9, wherein the engagement of the two detents with the slideable latch is configured to secure the slideable latch in the engaged position and the disengaged position, respectively.

12. The vertical insertion system of claim 9, wherein the slideable latch is slideable between an engaged position and a disengaged position, and the vertical interconnect module comprises an interconnect module housing that has a retaining feature that is captured by the slideable latch when the slideable latch is in the engaged position.

13. The vertical insertion system of claim 12, wherein the retaining feature comprises at least one tab.

14. The vertical insertion system of claim 9, wherein the vertical interconnection module is configured to mate with a detachable optical waveguide through an optical connector along an optical connector insertion direction.

15. The vertical insertion system of claim 14, wherein the slideable latch is slideable along a sliding direction between an engaged position and a disengaged position, and the optical connector insertion direction is parallel to the sliding direction of the slideable latch.

\* \* \* \* \*